United States Patent
Bayoumi

(10) Patent No.: US 10,969,119 B1
(45) Date of Patent: Apr. 6, 2021

(54) HYBRID PHOTOVOLTAIC DEVICE AND RADIANT HEATING AND COOLING DEVICE WITH THERMAL STORAGE

(71) Applicant: King Abdulaziz University, Jeddah (SA)

(72) Inventor: Mohannad Bayoumi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/999,129

(22) Filed: Aug. 21, 2020

(51) Int. Cl.
*F24D 11/02* (2006.01)
*H02S 40/44* (2014.01)
*E06B 9/24* (2006.01)

(52) U.S. Cl.
CPC .......... *F24D 11/0221* (2013.01); *H02S 40/44* (2014.12); *E06B 2009/2476* (2013.01); *F24D 2200/02* (2013.01); *F24D 2220/06* (2013.01); *F24D 2220/08* (2013.01); *F24D 2220/2081* (2013.01)

(58) Field of Classification Search
CPC .... H01L 31/052–0525; H02S 40/40–44; F24J 2/24; F24J 2/4643; F24J 2/482; F24J 2/488; F24J 2002/4692; F24S 10/746; F24S 10/754; F24D 11/0221
See application file for complete search history.

(56) References Cited

U.S. PATENT DOCUMENTS

| | | | |
|---|---|---|---|
| 6,630,622 B2 | 10/2003 | Konold | |
| 9,404,673 B2 | 8/2016 | Swift et al. | |
| 10,355,154 B1 | 7/2019 | Bayoumi | |
| 2007/0186922 A1* | 8/2007 | Guenter | H02S 40/44 126/651 |
| 2010/0288334 A1* | 11/2010 | Chu | F24S 80/56 136/248 |
| 2012/0247721 A1* | 10/2012 | Naneff | H02S 40/44 165/47 |
| 2013/0333310 A1* | 12/2013 | Damo | F24S 20/67 52/173.3 |
| 2014/0041710 A1* | 2/2014 | Hwang | F28D 15/0266 136/246 |

(Continued)

FOREIGN PATENT DOCUMENTS

| | | |
|---|---|---|
| EP | 0852689 | 7/2003 |
| EP | 1918661 | 5/2008 |

OTHER PUBLICATIONS

Pugsley et al., "BIPV/T facades—a new opportunity for integrated collector-storage solar water heaters? part 2" physical realisation and laboratory testing, Solar Energy 206, Aug. 2020, 751-769.

*Primary Examiner* — Eric R Smith
(74) *Attorney, Agent, or Firm* — W & C IP

(57) ABSTRACT

A hybrid photovoltaic and radiant heating and cooling device is provided, wherein the device comprises a photovoltaic panel; a radiant heating and cooling panel; a first heat-exchanging pipe in direct contact with a back surface of the photovoltaic panel; a second heat-exchanging pipe in direct contact with a back surface of the radiant heating and cooling panel; and a thermal storage tank fluidly connecting the first and the second heat-exchanging pipes, wherein the tank is arranged between the first and second heat-exchanging pipes.

9 Claims, 9 Drawing Sheets
(9 of 9 Drawing Sheet(s) Filed in Color)

(56) References Cited

U.S. PATENT DOCUMENTS

| | | | |
|---|---|---|---|
| 2014/0290915 A1* | 10/2014 | Koppikar | F24D 11/004 165/104.31 |
| 2016/0336898 A1* | 11/2016 | Ponzio, Jr. | F24S 90/10 |
| 2017/0133974 A1* | 5/2017 | Safir | F24S 20/67 |
| 2017/0230000 A1* | 8/2017 | Abdelghany Hassabou | H02S 40/44 |
| 2017/0294549 A1* | 10/2017 | Loertscher | H01L 31/0521 |
| 2018/0269828 A1* | 9/2018 | Beck | H01L 35/32 |

* cited by examiner

HYBRID PHOTOVOLTAIC DEVICE AND RADIANT HEATING AND COOLING DEVICE WITH THERMAL STORAGE

FIELD OF THE INVENTION

The invention is generally related to a combination of a facade integrated radiant heating panel and a photovoltaic device utilizing thermal storage to increase efficiency of the system.

BACKGROUND OF THE INVENTION

Radiant cooling and heating systems are becoming more popular due to the achievable high thermal comfort, low energy demand, quiet operation, and space saving. In these solutions, water pipes are attached to the back of a radiating metal panel. Circulating water is delivered through the pipe to cool down or heat up the panel. The tempered surface extracts a great portion of the heat (in the cooling mode) or adds heat (in the heating mode) inside a room via radiation and transports it to the heat transfer medium which is water via conduction [4], [5]. Convection also plays a role in the heat transfer. As the specific heat capacity of water is much higher than that of air, using water for room heat extraction is 4,000 times more energy efficient [6]. Furthermore, in hybrid cooling, the supplied and conditioned air volume is reduced to the adequate level to maintain a desired indoor air quality. While this is called an air-water cooling system, the conventional air conditioning approach is called an all-air system. Radiant cooling and heating can be integrated in floors, ceilings, walls, or any room surface. However, in the cooling mode, the surface temperature of the radiating panel needs to remain above the dew point temperature of the room air to avoid condensation on the surface. Several studies have explored methods to eliminate the risk of condensation [7]-[12]. However, novel technologies combining heating, cooling, and electricity generation while utilizing renewable resources are needed.

SUMMARY

Embodiments of the present disclosure combine a hybrid photovoltaic device and a radiant heating/cooling device with thermal storage and a heat pump to be used for heating, cooling, and electricity generation. The systems described herein integrate power generation, heating, refrigeration and many other functions while providing a high utilization rate and remarkable energy-saving effect, thereby improving the energy utilization rate to the maximum extent.

An aspect of the disclosure provides a hybrid photovoltaic and radiant heating and cooling device, comprising a photovoltaic panel; a radiant heating and cooling panel; a first heat-exchanging pipe in direct contact with a back surface of the photovoltaic panel; a second heat-exchanging pipe in direct contact with a back surface of the radiant heating and cooling panel; and a thermal storage tank fluidly connecting the first and the second heat-exchanging pipes, wherein the tank is arranged between the first and second heat-exchanging pipes.

In some embodiments, an upper portion of the tank feeds the second heat-exchanging pipe and a lower portion of the tank is connected to the first heat-exchanging pipe. In some embodiments, the device is integrated into a wall of a building. In some embodiments, the photovoltaic panel is adjacent to an external surface of the building and the radiant heating and cooling panel is adjacent to an internal surface of the building. In some embodiments, the device is configured to operate as a window and to selectively open and close. In some embodiments, a plurality of said devices is adapted to be mounted in series with one another.

In some embodiments, the device further comprises a heat pump fluidly connected to the thermal storage tank.

Another aspect of the disclosure provides a method of heating and/or cooling an enclosed space, comprising providing a hybrid photovoltaic and radiant heating and cooling device as described herein.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Embodiments of the disclosure provide a combination of a radiant heating/cooling panel, a hybrid photovoltaic device (PVT), and thermal storage.

A photovoltaic device refers to a device that can convert photon energy to an electric signal through a certain physical phenomenon (photovoltaic conversion). A solar cell, which is a type of the photovoltaic device, can efficiently convert the energy of the solar illumination to electric energy. Radiant heating and cooling panels exchange heat by both convection and radiation with the environments they are designed to heat or cool. In some embodiments, the radiating panel comprises an aluminium sheet with a thermal conductivity of around 190-210 W/m.K and a specific heat capacity Cp of 860-880 J/kg.K. Suitable PVT and radiant panels are described in U.S. Pat. No. 10,355,154 incorporated herein by reference.

Figure 1:
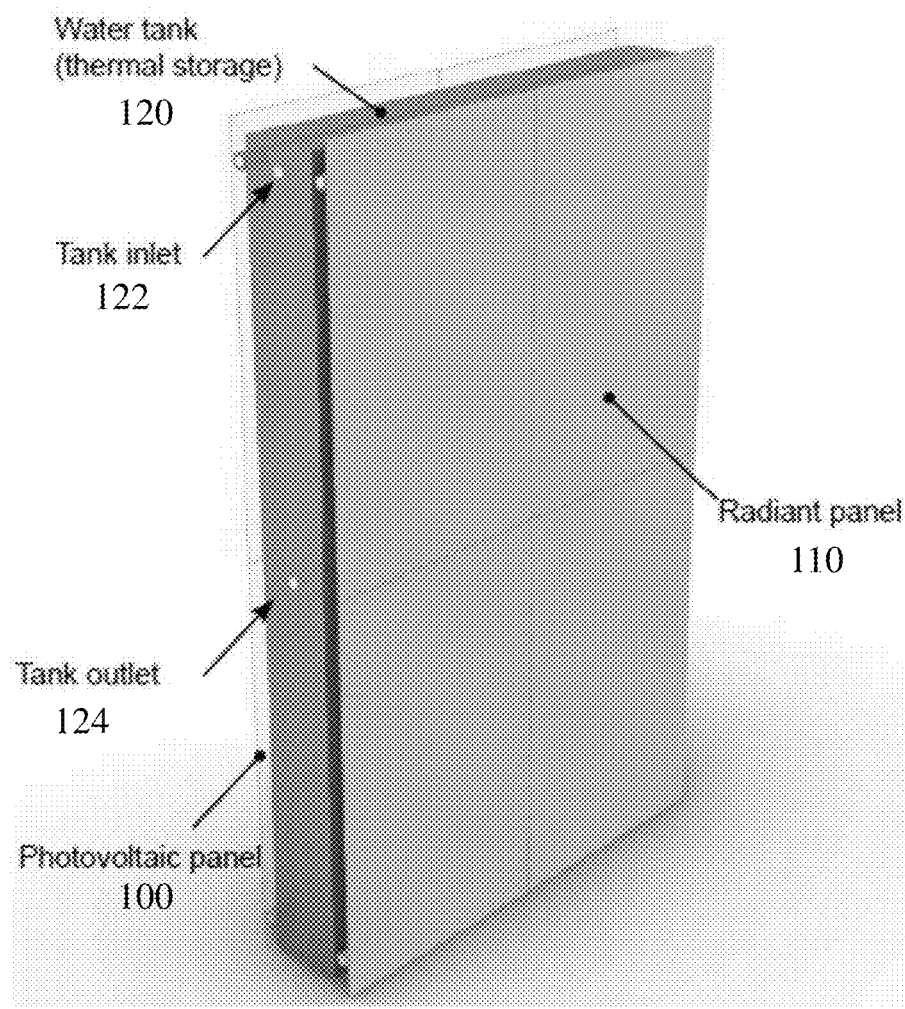
FIG. 1. Axonometric view of a radiant heating/cooling panel according to some embodiments of the disclosure.
Figure 2:
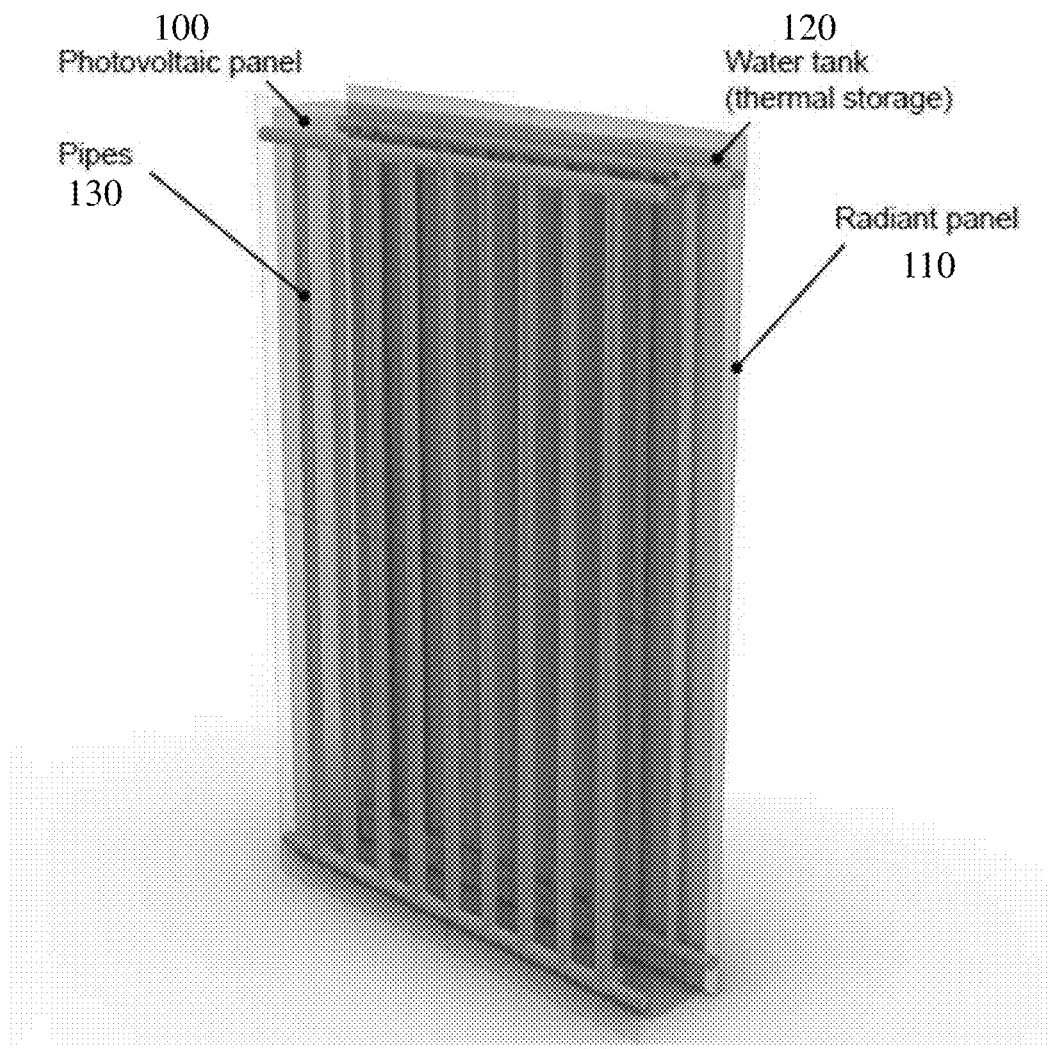
FIG. 2. External view showing pipes attached to the back of the PVT panel according to some embodiments of the disclosure. A high level of transparency has been set to the PVT panel.
Figure 3:
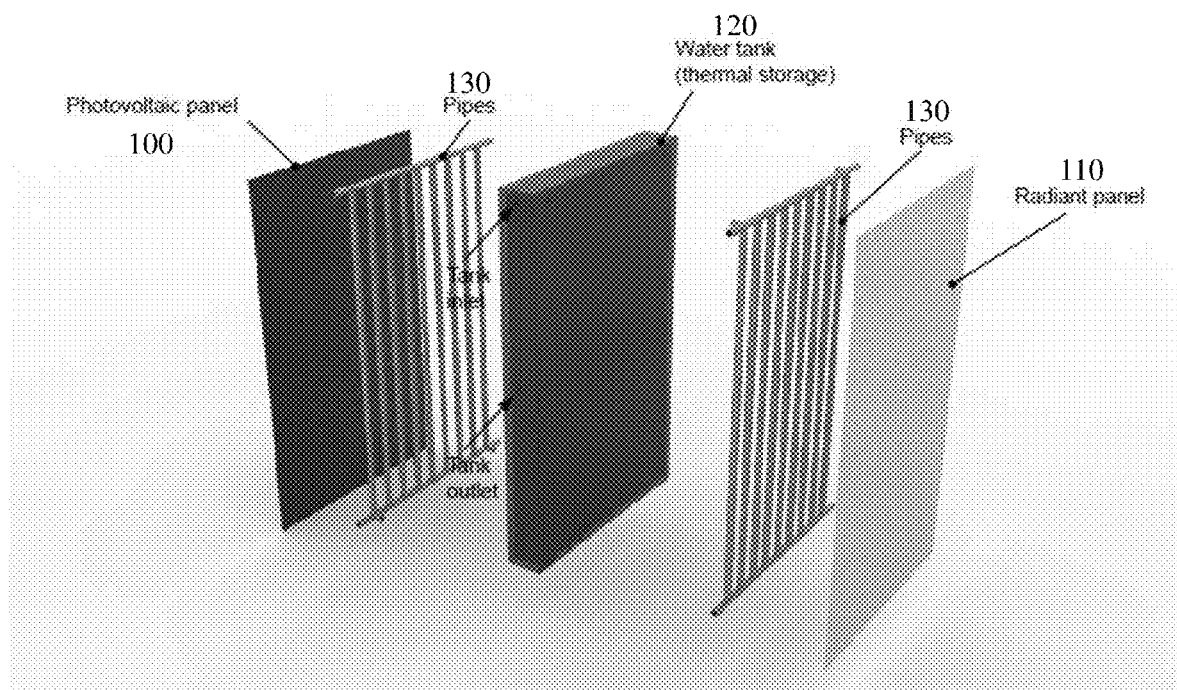
FIG. 3. Exploded axonometric view depicting components of a system according to some embodiments of the disclosure.
Figure 4:
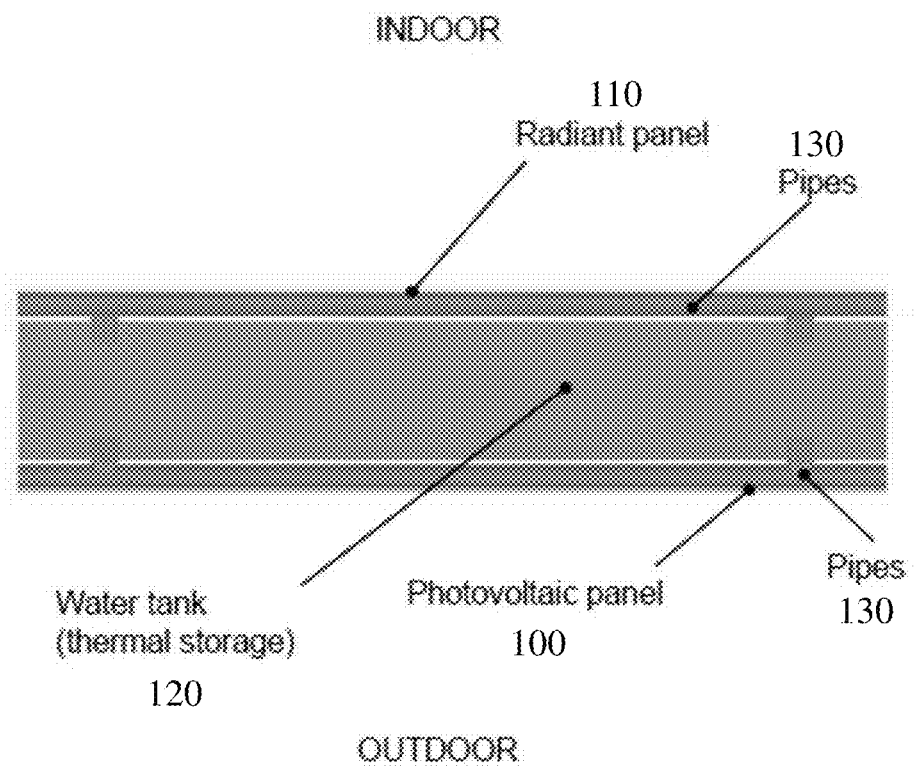
FIG. 4. Top view of a system according to some embodiments of the disclosure.
Figure 5:
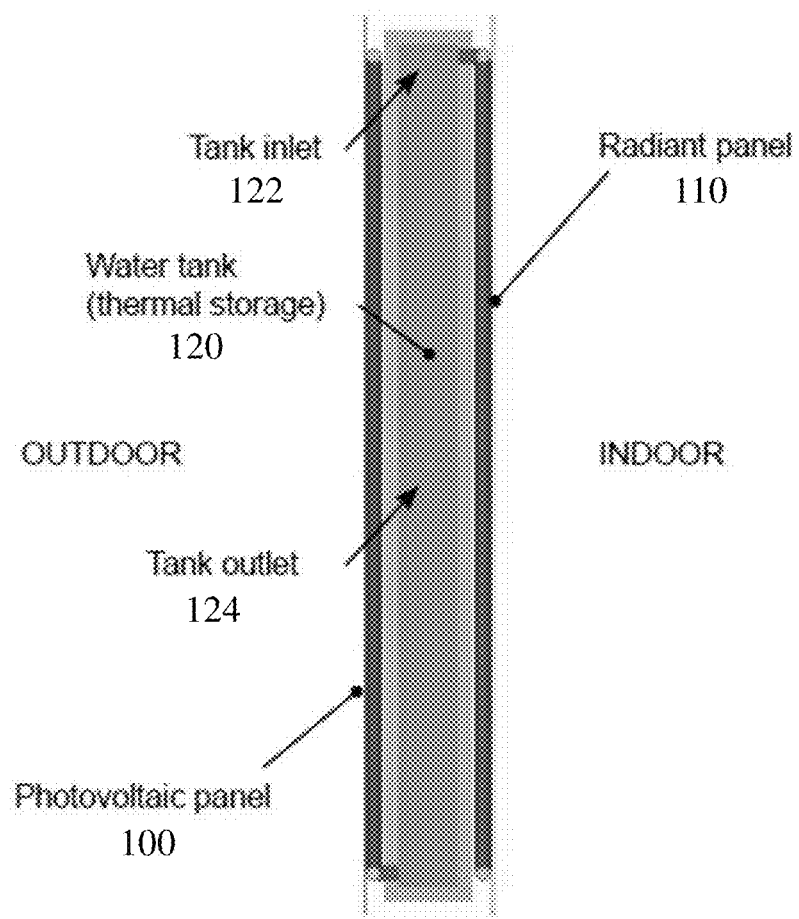
FIG. 5. Side view of a system according to some embodiments of the disclosure.
Figure 6:
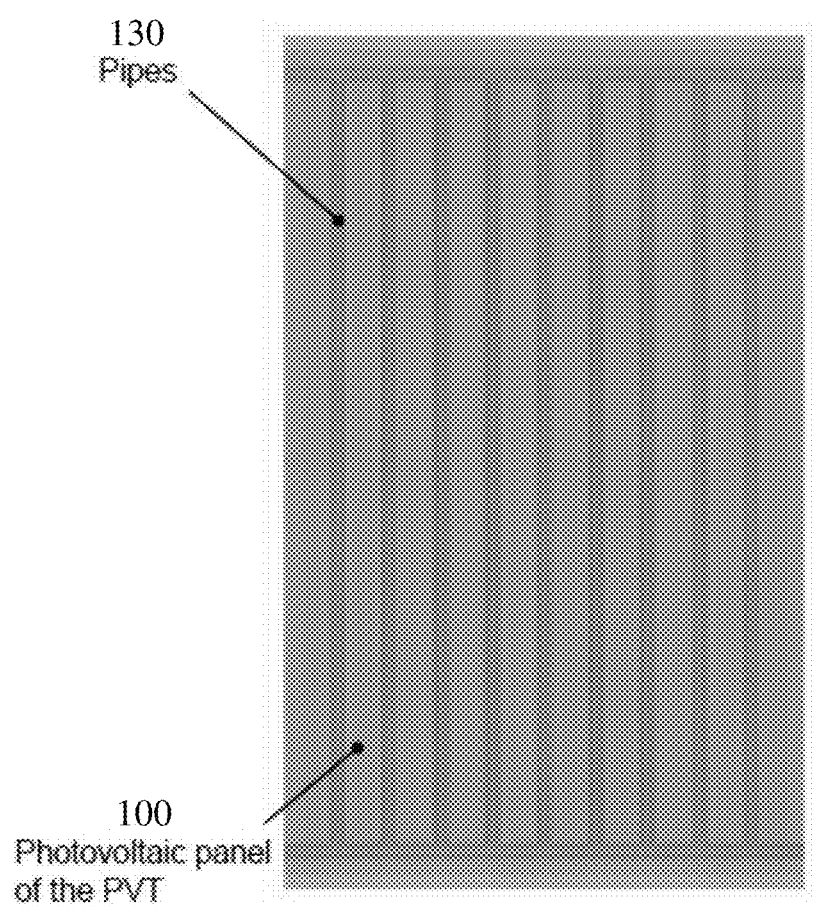
FIG. 6. Front view of a system according to some embodiments of the disclosure from the outside.
Figure 7:
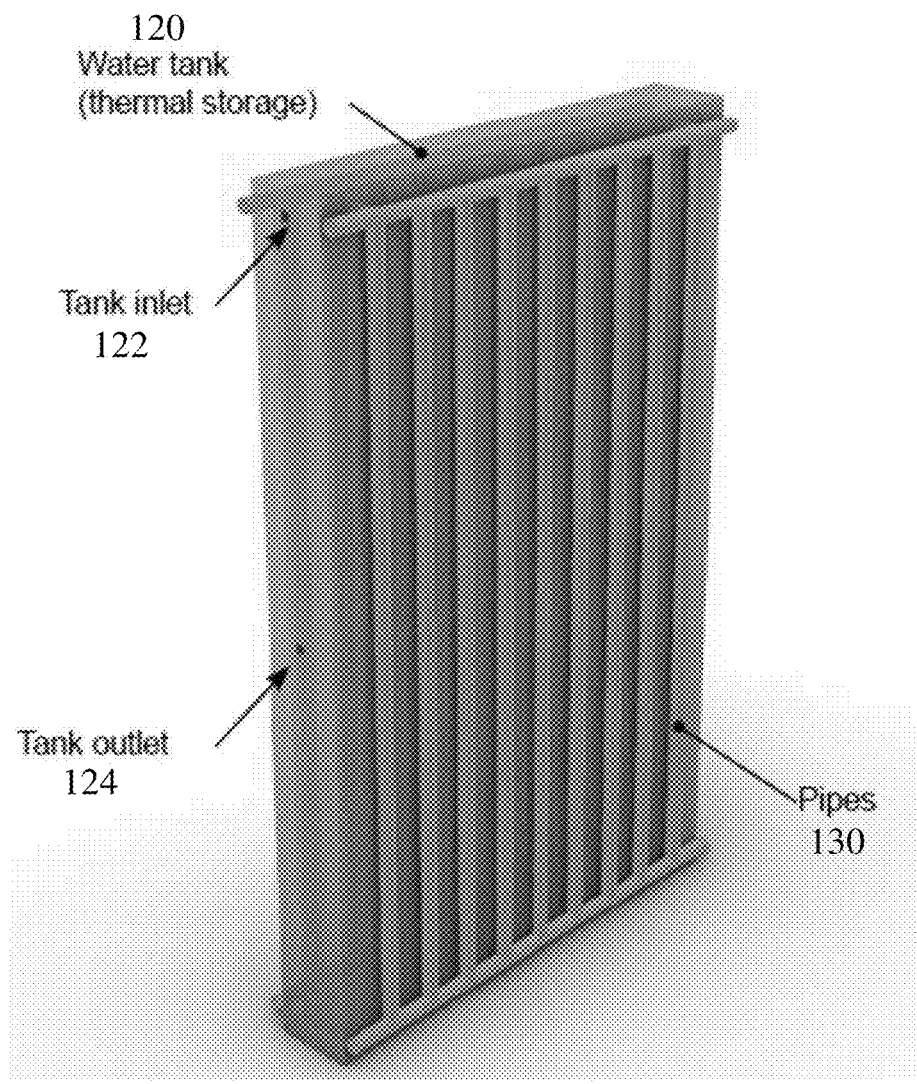
FIG. 7. Axonometric view of the pipes and the thermal storage water tank according to some embodiments of the disclosure.

When integrated into the facade of a building, the PVT is located on the external side of the building and the radiant heating/cooling surface faces the interior space (FIG. 4). The device can be integrated into walls, inclined walls and/or roofs. The device advantageously associates radiant heating with facade integrated energy generation which is suitable for high heating loads that occur in winter during times of high solar irradiation on south and southwest facades. The device is also suitable for cooling loads in summer which is seen in locations in moderated and cold climate zones. A device as described herein is useful for heating, cooling, and electricity generation.

In the context of the present disclosure, the term "building-integrated" refers to an embodiment in which the device is attached or affixed to a building or configured for this purpose. In an integrated form, the device may be mounted directly into a building wall, such as a replacement for an existing window, or may be separately mounted to an exterior surface of a building wall. Such mounting may include direct contact with the exterior surface of the building wall or may be offset therefrom, e.g. on a steerable device to maximize the angle of incidence with solar radiation and thereby improve energy efficiency.

With reference to FIGS. 1-7, the thermal storage 120 having an inlet 122 and outlet 124 is arranged between the PVT 100 and the radiant panel 110. The back of each panel is supported with metal heat exchanging pipes 130 that transfer heat to/from the panel by conduction. Therefore, the generated thermal energy can also be used for other applications such as potable water, air, and room heating. The fluid (e.g. water or another heat-transfer medium) in the pipes 130 flows into the thermal storage tank 120. The upper part of the storage feeds the pipes that are attached to the back of the heating/cooling panel. The lower part of the storage is connected to the pipes of the PVT element to help reduce its surface temperature and thus increase its efficiency.

Figure 8:
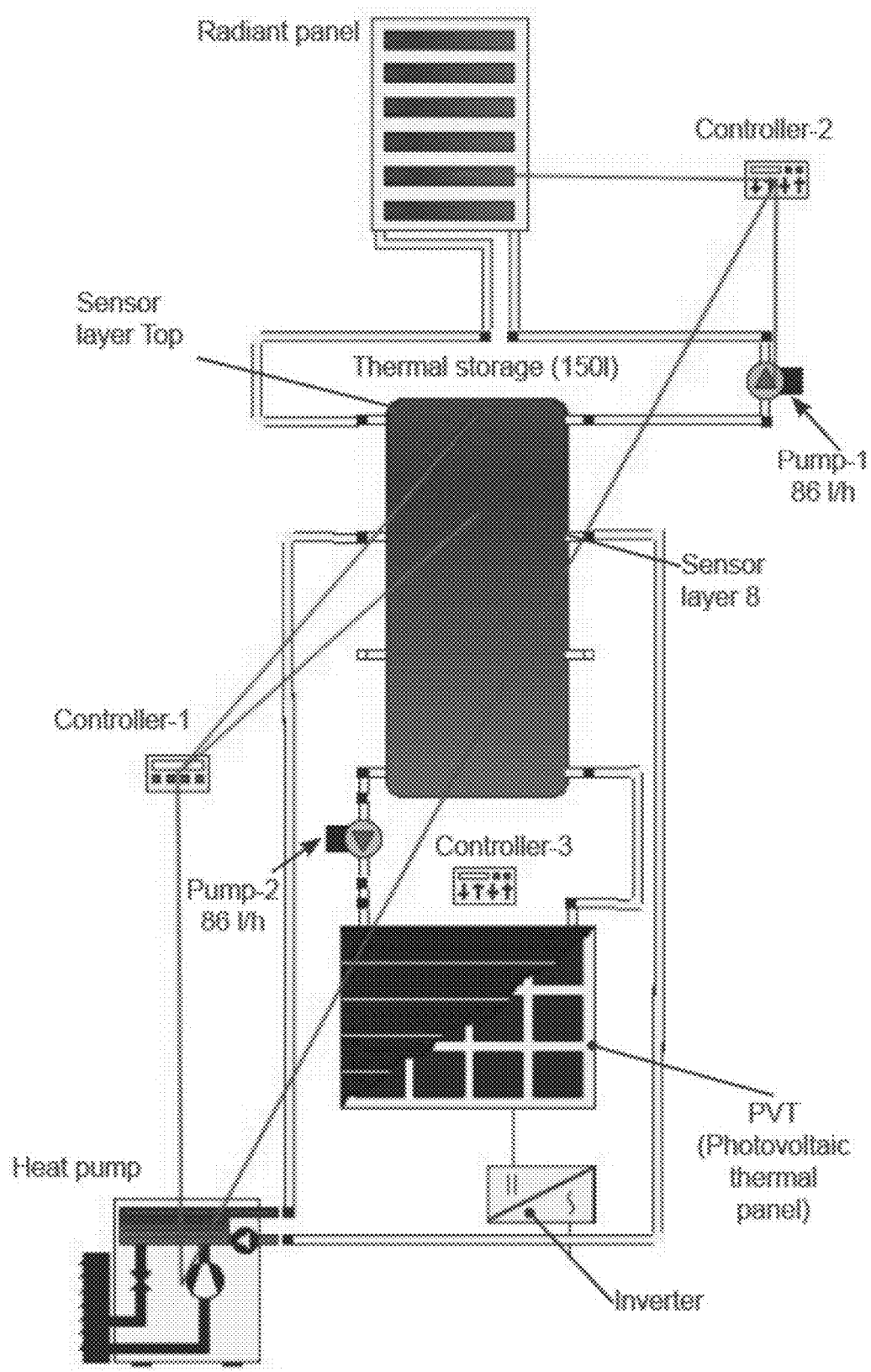
FIG. 8. Diagrammatic illustration of a system configuration according to some embodiments of the disclosure.

With reference to FIG. 8, in some embodiments, a heat pump is fluidly connected to the thermal storage tank to provide heated or cooled water. The warm/cold water is generated by the heat pump (warm water in winter for heating and cold water in summer for cooling) and supplied to the thermal storage. Two openings for warm/cold water supply and return are located on the side of the thermal storage tank. The heat pump may be electricity-driven and powered completely or partially by the PVT.

The circulating cold water in the pipes attached to the back of the system helps reduce the temperature of the PV surface. The thermal storage helps stabilize the temperature of the panel (reducing overheating) and reduce the operation times and power of the heat pump. The device can be used without anti-freeze as the thermal storage can supply warm water to the PVT element when needed.

Embodiments of the disclosure provide a "plug and play" wall element that can be mounted in modules to provide room conditioning and electricity using renewable resources in climates where heating and cooling are required. The system can be integrated in a modular fashion. Besides increasing the electricity generation efficiency of the PVT with the aid of the circulating cooling water at its back, the system provides increased energy efficiency through radiant heating and cooling as well as space efficiency through facade integration. The entire system can be sized flexibly to accommodate various wall thicknesses.

In one embodiment, a plurality of devices is connected in series or parallel on one more outer surfaces of a building, for example, a residence, a school, a factory or office building that may function as residential, commercial or industrial shelter.

The device may comprise a modular unit which may be fitted as a wall piece or partition to separate exterior and interior environments of a building. In this respect, the device is of construction similar to a conventional window. The surface area of the outside-facing photovoltaic panel is essentially the same as the surface area of the inside-facing radiant heating/cooling panel. As such, the device can be provided in a modular form having edges which are substantially parallel to one another and may fit easily into a partition or wall opening conventionally used for housing windows or other conventional partitioning or separating units. The device is preferably constructed such that it is in a frame which houses the PV panel and radiant cooling panel as exterior and interior-facing surfaces separated internally by a thermal storage tank that extends over the surface area of substantially the rear portion of the photovoltaic panel. In some embodiments, the device is mounted in a frame that reflects radiant solar energy.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

EXAMPLE

The system was modelled using Polysun to assess the system's performance and functionality. Munich, Germany was selected as a standpoint for the simulations as it is a location that requires both heating and cooling. South orientation with an inclination of 90° was selected. The assessment focused on the surface temperatures of both: the PVT and radiating panel with relation to external factors such as outdoor temperature and irradiance into the PVT module. The radiating panel comprises an aluminium sheet with a thermal conductivity of around 202 W/m.K and a specific heat capacity Cp of 871 J/kg.K. Also, the selected size of the radiating panel is similar to the PVT module which is 1 m×1.65 m. The pipes of both panels follow the same size and the water mass flowrate is also identical all over the components of the system. However, the water mass flowrate from/to the heat pump and the storage tank can be variable according to the heating or cooling demand of the system. The following table outlines the specifications of the PVT module:

TABLE 1

| Electrical data [1] | | | |
|---|---|---|---|
| Typical power | (Pn) | [Wp] | 245 |
| Open circuit voltage | (VOC) | [V] | |
| Maximum power voltage | (Vpm) | [V] | |
| Short circuit current | (Isc) | [A] | 8.74 |
| Maximum power current | (Ipm) | [A] | 8.17 |
| Module efficiency | ($\eta$) | [%] | 15.5 |
| Maximum system voltage | | [V DC] | 1000 |
| Reverse current load | (Ir) | [A] | 15 |
| Temperature coefficient - Pn | ($\gamma$) | [%/° C.] | −0.43 |
| Temperature coefficient - VPm | ($\beta$) | [%/° C.] | −0.34 |
| Temperature coefficient - Ipm | ($\alpha$) | [%/° C.] | 0.065 |
| Thermal data - in the case of PVT | | | |
| Aperture area | | [m$^2$] | 1.59 |
| Thermal efficiency [2] | ($\eta_0$) | [%] | 56 |
| Nominal thermal power [3] | | [W] | 888 |
| Volume flow rate | | [l/m] | 1.5-2.5 |
| Flow losses | | [mmH$_2$O] | 400-900 |
| Fluid volume | | [l] | 0.9 |
| Coefficient $\alpha$1 [2] | | [—] | 9.12 |
| Coefficient $\alpha$2 [2] | | [—] | 0 |
| Effective thermal capacity | | [kJ Kg$^{-1}$ K$^{-1}$] | 20 |
| IAM K0 at 50° C. | | | |
| Specification | | | |
| Cells | | [—] | 60 poly-Si |
| Thickness | | [mm] | 156 |
| Electrical connectors | | [—] | MC4 |
| Hydraulic connector | | ["] | ½ female |
| Dimensions | | [mm] | 1638 × 982 × 41 |
| Weight | | [kg] | 27 |

[1] STC condition: irradiance = 1000 W/m2, cell temperature = 25° C.
[2] Based on aperture area
[3] PV OFF conditions referred to (Tm − Ta) = 0

The simulation model is also supported by controllers that assign operation signals to the various pumps. The controllers are connected to certain layers in the water thermal storage using temperature sensors. The simulation was made for 8760 hours and covers the four seasons of the year. According to the schematic diagram, the height of the water supply and return in each component including the thermal storage is important as it affects the thermal quality of the water. The shown configuration was the result of different arrangements and indicates the optimum outcome (FIG. 8). Moreover, the three-dimensional model was built with the consideration of this aspect. To elaborate, the cooling of the PVT panel needs a relatively low temperature water from the tank. Therefore, the water supply and return pipes are located in the lower part unlike the radiant panel where the pipes are located in the higher part which showed good results for the heating as well as the cooling modes. However, the location of the connections may be varied.

Figure 9:
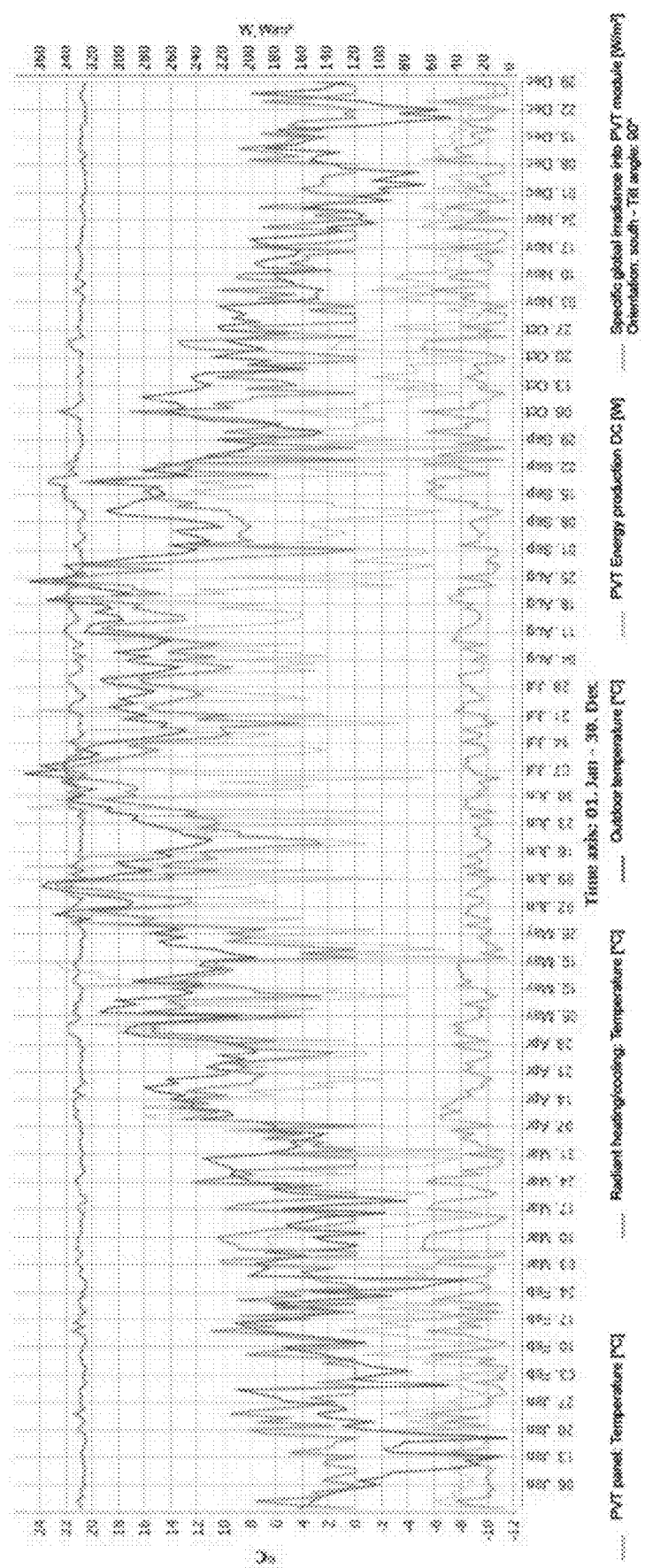
FIG. 9. Illustration of the simulation results over the course of one year.

As shown in FIG. 9, the primary axis depicts the temperatures in ° C. and the secondary axis depicts the energy in W and W/m$^2$. The yellow curve indicates the PVT DC electric energy production in W and the light gray curve indicates the global irradiance into the module in W/m$^2$. The outdoor temperature is indicated with the black curve and the PVT panel temperature is indicated with the red curve. The blue curve depicts the surface temperature of the radiating panel that serves the cooling and heating function of the room.

From the diagram it can be seen the temperature of the radiating element is stable around 21° C. and swings within a small range of 1-1.5K. This reflects the impact of the thermal storage on stabilizing the temperature of the radiating panel. Another advantage of the relatively cool water in the bottom of the tank is that the surface temperature of the PVT panel in summer is significantly lower than the outdoor temperature. In winter, the panel temperature is controlled to remain above 0° C. during minus temperature times to avoid the need for anti-freeze solutions. However, this aspect can be further optimized using the controlling schemes. From the results of other simulations, the surface temperature of a convention PV panel reaches 52.8° C. in the selected location. In the system described herein, the maximum surface temperature reached 37° C. This has significant advantages for the energy production and performance enhancement as for every 1K increase in the surface temperature of the PV panel above 25° C., a reduction of 0.5% in the performance is expected.

From the diagram, it is also clear that the PVT DC electric energy production is increased in winter, spring, and autumn where the sun altitude is relatively low. During these times, the radiating panel presents a surface temperature that is reliable for keeping the mean radiant temperature of the room within the comfort range. The generated electric energy can be used to operate the electric driven heat pump.

Moreover, the shown generated results are made with respect to the set parameters of the controller system that can be altered to achieve other desired conditions.

TABLE 2

| Outline of the controllers parameters | | |
|---|---|---|
| Controller-1 | | |
| Cut-in tank temperature | [° C.] | 20 |
| Cut-off tank temperature | [° C.] | 20 |
| Maximum tank temperature | [° C.] | 22 |
| Control inputs | | |
| Layer temperature sensor on | [—] | Storage tank: Layer 8 |
| Layer temperature sensor off | [—] | Storage tank: Top Layer |
| Control outputs | | |
| On/Off heating device | [%] | Heat pump: On/Off |
| Controller-2 | | |
| Control inputs | | |
| Sensor input-1 | [° C.] | Radiant cooling temperature |
| Sensor input-2 | [° C.] | Average outdoor temperature |

TABLE 2-continued

Outline of the controllers parameters

Control outputs

| | | |
|---|---|---|
| Pump-1 | [%] | On/Off |
| Heat pump Operating status | [W] | Controlled power heat generator |
| If Sensor input-1(i1 > 23) | then | Pump-1 -> off |
| If Sensor input-1(i1 > 23) | then | Heat pump -> off |
| If Sensor input-1(i2 > 20) | then | Pump-1 -> on |
| If Sensor input-1(i2 > 20) | then | Heat pump -> 100 W |
| If Sensor input-1(i1 < 20) | then | Pump-1 -> on |
| If Sensor input-1(i1 < 20) | then | Heat pump -> 100 W |

Controller-3

Control inputs

| | | |
|---|---|---|
| Sensor input-1 | [° C.] | PVT panel temperature |

Control outputs

| | | |
|---|---|---|
| Pump-2 Operating status | [%] | On/Off |
| If Sensor input-1(i1 > 22) | then | Pump-1 -> on |
| If Sensor input-2(i2 < 20) | then | Pump-1 -> off |

REFERENCES

[1] A. Pugsley, A. Zacharopoulos, J. D. Mondol, and M. Smyth, "BIPV/T facades—A new opportunity for integrated collector-storage solar water heaters? Part 2: Physical realisation and laboratory testing," *Sol. Energy*, vol. 206, no. February, pp. 751-769, 2020.

[2] A. Pugsley, A. Zacharopoulos, J. D. Mondol, and M. Smyth, "BIPV/T facades—A new opportunity for integrated collector-storage solar water heaters? Part 2: Physical realisation and laboratory testing," *Sol. Energy*, vol. 206, no. February, pp. 751-769, 2020.

[3] E. Perez-serrano and M. Isabel, "Solar collector integrated in a facade," EP001538402A1, 2005.

[4] E. P. Application, "Building element with integrated solar heating element," 2007.

[5] P. E. W. Davis and A. E. C. Yeung, "MODULAR CONSTRUCTION FOR SOLAR HEAT COLLECTOR," 4,154,223, 1979.

[6] B. W. Davis, J. T. Diep, and S. Jose, "RADIANT HEATING AND COOLING PANEL," U.S. Pat. No. 8,256,690 B2, 2017.

[7] A. Prieto, U. Knaack, T. Auer, and T. Klein, "SOLAR COOLFACADES Framework for the integration of solar cooling technologies in the building envelope," *Energy*, 2017.

[8] H.-M. Henning and International Energy Agency. Solar Heating and Cooling Programme., *Solar-assisted air-conditioning in buildings: a handbook for planners*. Wien; New York: Springer, 2004.

[9] H. Christensen, "Solar collector panel," WO2006/102891.

[10] D. City, D. City, and D. City, "PVT HEAT PUMP SYSTEM CAPABLE OF ACHIEVING DAY-NIGHT TIME-SHARED COMBINED COOLING, HEATING AND POWER USING SOLAR RADIATION AND SKY COLD RADIATION," U.S. 2020/0033013 A1, 2020.

[11] N. J. Paik, W. Shin, K. Lee, and L. S. Myung, "Solar thermal and photovoltaic composite energy water heater," KR20160136528A, 2016.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

I claim:

1. A hybrid photovoltaic and radiant heating and cooling device, comprising:
a photovoltaic panel;
a radiant heating and cooling panel;
a first heat-exchanging pipe in direct contact with a back surface of the photovoltaic panel;
a second heat-exchanging pipe in direct contact with a back surface of the radiant heating and cooling panel; and
a thermal storage tank fluidly connecting the first and the second heat-exchanging pipes, wherein the tank is arranged between the first and second heat-exchanging pipes, and wherein the tank and the first and second heat exchanging pipes are between the photovoltaic panel and the radiant heating and cooling panel, all in a thickness direction,
wherein the photovoltaic panel, the radiant heating and cooling panel, the first heat-exchanging pipe, the second heating-exchanging pipe, and thermal storage tank are assembled together as a modular unit which is integratable into a wall, window, or roof of a building.

2. The device of claim 1, wherein an upper portion of the tank feeds the second heat-exchanging pipe and a lower portion of the tank is connected to the first heat-exchanging pipe.

3. The device of claim 1, wherein the device is integrated into a wall of a building.

4. The device of claim 3, wherein the photovoltaic panel is adjacent to an external surface of the building and the radiant heating and cooling panel is adjacent to an internal surface of the building.

5. The device of claim 3, wherein the device is configured to operate as a window and to selectively open and close.

6. The device of claim 1, comprising a plurality of said devices adapted to be mounted in series with one another.

7. The device of claim 1, further comprising a heat pump fluidly connected to the thermal storage tank.

8. The device of claim 1, wherein the thermal storage tank has an inlet for the first or second heat exchanging pipes which is vertically above an outlet for the first and second heat exchanging pipes.

9. A method of heating and/or cooling an enclosed space, comprising providing a hybrid photovoltaic and radiant heating and cooling device of claim 1 and integrating it into a wall or a roof of a building with the photovoltaic panel oriented outside of the building and the radiant heating and cooling panel oriented inside of the building.

* * * * *